Patented June 23, 1942

2,287,249

UNITED STATES PATENT OFFICE 2,287,249

CHLORINE DERIVATIVES OF BENZYL PHENYL ETHER

Harold S. Holt, Wilmington, Del., assignor to E. I. du Pont de Nemours & Company, Wilmington, Del., a corporation of Delaware No Drawing. Application June 27, 1940, Serial No. 342,693

3 Claims. (Cl. 260—612)

This invention relates to new chemical compounds particularly adapted for preserving keratinous textiles and like fabrics against attack by clothes moths and their allies, and is more particularly directed to polychlorinated benzyl phenyl ethers in which all the chlorine is present as nuclear substituents in the benzyl group.

The depredations of the common clothes moths and their allies, the carpet beetles, are common knowledge and many methods of control are advocated, among which may be mentioned contact spraying, fumigation and mothproofing. Each of these methods has its own peculiarities and problems of which the most difficult are probably encountered in mothproofing, for it is one thing to kill the moth larvae but quite another to proof the textile against their depredations. Rarely are known insect poisons effective for mothproofing, and few if any of the mothproofing agents are entirely satisfactory, whether it be because of color, odor, low toxicity, high volatility, instability to air, light or heat, or because of some other undesirable characteristic. For example, some agents deleteriously affect the feel of the treated goods, others do not act sufficiently rapidly to prevent all feeding and others do not have suitable chemical and physical properties for economic application, as for example in dry-cleaning solvents.

It has now been found that certain of the chlorinated benzyl phenyl ethers are so highly toxic to moth larvae that suitably treated fabrics are rendered immune to attack and at the same time possess such desirable and necessary characteristics as good solubility in dry-cleaning solvents, lack of color, lack of odor, and stability to air, light and moderate heat, and, moreover, leave the color, feel and other characters of the goods treated entirely unaffected.

The active agents of the mothproofing compositions and methods are the nuclear chlorinated benzyl phenyl ethers which do not have a molecular weight in excess of 360 and preferably which have a molecular weight in the neighborhood of 300. Suitable materials include 2,4,6-trichlorobenzyl phenyl ether, 2,4-dichlorobenzyl phenyl ether, 2-chlorobenzyl phenyl ether, 2,4,6-trichlorobenzyl o-tolyl ether, benzyl 2,4,5-trichlorophenyl ether, benzyl 2,4,6-trichlorophenyl ether, 4-chlorobenzylphenyl ether, 2,4,6-trichlorobenzyl 2-acetylphenyl ether, 2,4,6-trichlorobenzyl 4-tert.-amylphenyl ether, and 2,4,6-trichlorobenzyl beta-naphthyl ethers. It will of course be understood that the exact position of the chlorine atoms in some instances is not definitely known, and that those given are based upon the best evidence available. It does not appear, however, that the exact position of the chlorine atoms is critical, although it is believed that chlorine is more effective in the 2- (or 6-) position. The more highly chlorinated ethers, such as the trichloro- and particularly the trichlorobenzyl ethers of molecular weight not substantially in excess of 315, are preferred.

The novel chlorinated benzyl phenyl ethers of this invention additionally are useful as extreme pressure bases for lubricants, as gum solvents for lubricating oils, as weed killers, as dust collecting liquids, as heat transfer liquids, and as plasticizers. Illustrative methods for their preparation are given in the following examples in which the parts are by weight unless otherwise specified.

Example 1

A mixture comprising 92.0 parts of trichlorobenzyl chloride (obtained from the chlorination of toluene), 37.6 parts of phenol, 16.0 parts of sodium hydroxide, and 200 parts of 95% ethyl alcohol is charged into a reactor fitted with a reflux condenser and vapor-sealed agitator, and heated by a steam jacket. The reaction is allowed to run for 16 hours after which the precipitated sodium chloride is filtered off, the alcohol distilled from the filtrate, and the residue poured into a solution of 5 parts of sodium hydroxide in 500 parts of water. After separating the oily product from the water and drying, 106 parts (92.2% of theoretical) of crude trichlorobenzyl ether is obtained. Upon distilling, the major fraction boils at 194–195° C./7 mm. This consists essentially of pure trichlorobenzyl phenyl ether.

Example 2

A mixture consisting of 12.6 parts of 95% flake sodium hydroxide, 120 parts of absolute alcohol, and 28.2 parts of phenol is charged into a reactor equipped with a reflux condenser and sealed agitator, and refluxed with stirring for one hour. At the end of this time 69 parts of trichlorobenzyl chloride (boiling point 97–103° C./2 mm., and containing by analysis 60.8% chlorine) is added during the space of ½ hour. After 16 hours of refluxing with stirring the mixture is cooled. The precipitated sodium chloride is filtered off and washed with ether. The alcohol-ether combined filtrate is then evaporated and the product fractionally distilled under reduced pressure. Fifty-nine and five-tenths parts of pure trichlorobenzyl phenyl ether distilling at 171–6°/2 mm. is obtained. This product contains by analysis 36.22% chlorine and has a refractive index of $N_d^{25}$ 1.6051.

EXAMPLE 3

The procedure of Example 2 may be modified to the extent that 6.9 parts of sodium is used in place of the sodium hydroxide, and the reaction mixture is refluxed only one hour after the addition of the trichlorobenzyl chloride. By this method approximately the same yield of the pure ether is obtained.

EXAMPLE 4

Six and nine-tenths parts of sodium is dissolved in 500 parts of dioxane containing 30 parts of phenol by heating the mixture in a steam-jacketed reactor for 2 hours. When the sodium is all dissolved 69 parts of redistilled trichlorobenzyl chloride is added to the solution with stirring and while maintaining the temperature at 100° C. The mixture is stirred at 100° C. for 4 hours during which time sodium chloride precipitates. The product is isolated in the manner described in Example 2. The main fraction consists of 31.5 parts of an oil boiling at 158–177° C./2 mm.

EXAMPLE 5

A mixture consisting of 42 parts of anhydrous potassium carbonate, 60 parts of anhydrous acetone, 28.2 parts of phenol, and 69 parts of redistilled trichlorobenzyl chloride is stirred at room temperature for 10 minutes and then refluxed in a steam-jacketed reactor for 7 hours. The product is isolated and purified by the procedure of Example 2 above, the main fraction consisting of an oil boiling at 175–178° C./2 mm. Fifty-six parts of the pure trichlorobenzyl phenyl ether is obtained.

Using procedures similar to those of the above examples, particularly Example 2, dichlorobenzyl, tetrachlorobenzyl, and pentachlorobenzyl phenyl ethers may be prepared. In each case substantially equimolecular proportions of the chlorobenzyl chloride, caustic alkali, and phenol are used. Example 6 is illustrative of the manner in which these other chlorobenzyl phenyl ethers are obtained.

EXAMPLE 6

The procedure of Example 2 is repeated using the following materials: 29.6 parts of 95% flake sodium hydroxide; 240 parts of absolute ethanol; 66 parts of phenol; and 137 parts of dichlorobenzyl chloride of boiling range 118–122° C./15 mm. The product, dichlorobenzyl phenyl ether, is obtained in the amount of 130 parts. It distills at 115–116° C./1.5 mm., contains 27.99% chlorine by analysis, and has a refractive index of $N_d^{25}$ 1.5933.

Other chlorinated benzyl phenyl ethers may be prepared by similar condensations from the chlorinated phenols and benzyl chloride.

The effectiveness of the chlorinated benzyl phenyl ethers of this invention is determined by standardized and rigorous tests in which test specimens of fluffy woolen fabrics, which were impregnated with the chlorinated benzyl phenyl ether from a solution of the ether in acetone and dried, are exposed to moth larvae for a period of two weeks under conditions in which untreated check specimens are damaged to an extent of 50 to 90% and not more than 10% of the larvae die. Data from these tests are given in the following table:

TABLE I

| Compound | Conc. | Tineola biselliella larvae killed | Area of fabric damaged |
|---|---|---|---|
| 4-chlorobenzyl phenyl ether | 2 | 80 | 30 |
| 2-chlorobenzyl phenyl ether | 2 | 100 | 10 |
| 2,4-dichlorobenzyl phenyl ether | 2 | 100 | 3 |
| 2,4,6-trichlorobenzyl phenyl ether | 2 | 100 | 1 |
| Do | 0.55 | 100 | 3 |
| 2,4,6-trichlorobenzyl o-tolyl ether | 2 | 100 | 1 |
| Benzyl 2,4,5-trichlorophenyl ether | 2 | 100 | 1 |
| Benzyl 2,4,6-trichlorophenyl ether | 2 | 80 | 7 |

Additional tests similar to the above show that the chlorinated benzyl phenyl ethers are effective for mothproofing against the black carpet beetle (*Attagenus piceus*). This pest is more difficult to control than the common clothes moth. Nevertheless, the test fabric was well protected by trichlorobenzyl phenyl ether, as shown by the following table:

TABLE II

*Evaluation of trichlorobenzyl phenyl ether against clothes moth and carpet beetle larvae*

| Compound | Conc. | Performance** | |
|---|---|---|---|
| | | Clothes moth | Carpet beetle |
| 2,4,6-trichlorobenzyl phenyl ether | Percent 2.28 | 95–0 | 93–4 |
| Do | 1.14 | 95–0 | 90.7 |
| Sodium aluminum fluosilicate | *0.1 | 90–3 | 80–4 |
| Untreated check | | 5–85 | 10–40 |

*This figure represents the concentration of the aqueous impregnating solution. As the sodium aluminum fluosilicate tends to be selectively adsorbed from solution, it is estimated that the actual concentration in the fabric is in the neighborhood of 1 or 2 per cent.
**The first figure given is the per cent mortality, while the second is the per cent of surface area damaged.

From the above data the high efficiency of trichlorobenzyl phenyl ether in controlling clothes moths and carpet beetles, the most common and economically important textile insects, is readily seen. The higher effectiveness of the more highly chlorinated ethers is also readily seen. It is likely that relative volatility may be a factor, but it is by no means to be inferred that the lower the volatility the greater the effectiveness because some of the more highly chlorinated compounds, such as trichlorobenzyl trichlorophenyl ether, give results which are not significantly better than those of untreated controls.

Typical of the class are the properties of trichlorobenzyl phenyl ether. Others of the class, however, do not posses all the desirable characteristics for mothproofing agents characteristic of trichlorobenzyl phenyl ether. The effectiveness of trichlorobenzyl phenyl ether has already been shown. Further advantages that enhance the value of this newly discovered mothproofing agent include the following: It is a relatively cheap product, easily prepared from readily obtainable raw materials. It is a liquid possessing only very slight odor and color, and it is very soluble in the usual dry-cleaning solvents such as Stoddard solvent, naphtha, "Per-Clene" and "Tri-Clene." The material is stable to light and heat, and at ordinary temperatures possesses only a negligible vapor pressure. The compound is essentially non-toxic to the higher animals and, moreover, is non-irritating to the epidermis and mucous membranes. Finally, it produces no effect whatsoever upon the color of dyed fabrics and produces no change in the durability and feel of delicate fabrics.

The mothproofing agents of this invention may be used for treating and preserving woolen textiles, hair goods, furs and other materials subject to the depredations of moths, carpet beetles and other insect pests that prey upon and destroy such goods. For these purposes they may be applied in various compositions, as for example, as solutions in organic solvents such as acetone, alcohol, and the usual dry-cleaning solvents, or in emulsified form along with various dispersants such as soaps, wetting agents, penetrating agents, and other adjuvants commonly used in the mothproofing and dry-cleaning trades. The mothproofing agents of this invention may also be used in combination with other pest control agents such as fungicides, salicylanilide for example, or insecticides as pyrethrum and rotenone. Mothproofing compositions containing our chlorobenzyl phenyl ethers may be applied to woolen goods during the dry-cleaning operation or may be applied as a separate step or in the rinsing liquids.

I claim:
1. A polychlorinated benzyl phenyl ether selected from the class consisting of trichlorobenzyl phenyl ether, trichlorobenzyl o-tolyl ether, trichlorobenzyl 2-acetyl phenyl ether, and trichlorobenzyl 4-tertiary-amyl phenyl ether.
2. Trichlorobenzyl phenyl ether.
3. 2,4,6-trichlorobenzyl phenyl ether.

HAROLD S. HOLT.